(12) United States Patent
Ueki

(10) Patent No.: US 10,132,380 B2
(45) Date of Patent: Nov. 20, 2018

(54) VIBRATION-DAMPING DEVICE

(71) Applicant: BRIDGESTONE CORPORATION, Tokyo (JP)

(72) Inventor: Akira Ueki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/305,116

(22) PCT Filed: Apr. 22, 2015

(86) PCT No.: PCT/JP2015/062286
§ 371 (c)(1),
(2) Date: Oct. 19, 2016

(87) PCT Pub. No.: WO2015/166864
PCT Pub. Date: Nov. 5, 2015

(65) Prior Publication Data
US 2017/0037924 A1    Feb. 9, 2017

(30) Foreign Application Priority Data

Apr. 30, 2014   (JP) ................................ 2014-094160

(51) Int. Cl.
*F16F 5/00*        (2006.01)
*F16F 13/10*       (2006.01)
(Continued)

(52) U.S. Cl.
CPC .......... *F16F 13/107* (2013.01); *B60K 5/1208* (2013.01); *F16F 13/10* (2013.01); *F16F 13/14* (2013.01)

(58) Field of Classification Search
CPC .... F16F 9/34; F16F 13/08; F16F 13/10; F16F 13/107; F16F 13/14; B60K 5/1208
(Continued)

(56) References Cited

U.S. PATENT DOCUMENTS 4,739,962 A * 4/1988 Morita .................... F16F 9/34
                                                    267/140.13
5,085,058 A * 2/1992 Aaron .................... F25B 41/06
                                                    138/44
(Continued)

FOREIGN PATENT DOCUMENTS

CN        2308763 Y    2/1999
CN      201090655 Y    7/2008
(Continued)

OTHER PUBLICATIONS

Communication dated May 3, 2017, from the European Patent Office in counterpart European application No. 15785230.2.
(Continued)

*Primary Examiner* — Pamela Rodriguez
(74) *Attorney, Agent, or Firm* — Sughrue Mion, PLLC

(57) ABSTRACT

A vibration-damping device (10) includes a first attachment member (11), a second attachment member (12), an elastic body, and a partitioning member (16). A limiting passage (30) that allows a main liquid chamber (14) and an auxiliary liquid chamber (15) to communicate with each other is formed in the partitioning member (16). An inner peripheral surface of the limiting passage (30) is provided with a flow changing protrusion (31) that protrudes toward an inner side in a radial direction of the limiting passage (30) and that changes the flow of a liquid (L) that flows into the limiting passage (30) from the main liquid chamber (14) and flows through the limiting passage (30) in an axial direction of the limiting passage (30). In a vertical cross-sectional view passing through an axis of the limiting passage (30) and through the flow changing protrusion (31), the limiting passage (30) and the flow changing protrusion (31) have symmetrical shapes with respect to the axis. A protruding end of the flow changing protrusion (31) forms an inner (Continued)

peripheral edge of a passage hole (31c) that is open on both sides in the axial direction.

8 Claims, 11 Drawing Sheets

(51) Int. Cl.
*F16F 13/14* (2006.01)
*B60K 5/12* (2006.01)

(58) Field of Classification Search
USPC .................. 267/140.13, 140.11, 141, 141.2; 248/562, 636, 638
See application file for complete search history.

(56) References Cited

U.S. PATENT DOCUMENTS

| | | | |
|---|---|---|---|
| 5,246,211 A | 9/1993 | Klein et al. | |
| 6,199,840 B1* | 3/2001 | Yano | F16F 13/14 267/140.12 |
| 6,454,249 B1* | 9/2002 | Childers | F16F 13/262 267/140.14 |
| 6,547,226 B2* | 4/2003 | Shores | F16F 13/106 267/140.11 |
| 9,074,654 B2 | 7/2015 | Ueki et al. | |
| 2003/0098532 A1* | 5/2003 | Tewani | F16F 13/105 267/140.11 |
| 2004/0089989 A1* | 5/2004 | Tewani | F16F 13/107 267/140.13 |
| 2016/0160956 A1* | 6/2016 | Ueki | F16F 13/107 267/140.13 |
| 2016/0281814 A1 | 9/2016 | Ueki | |
| 2017/0045108 A1 | 2/2017 | Ueki | |

FOREIGN PATENT DOCUMENTS

| | | |
|---|---|---|
| CN | 101548115 A | 9/2009 |
| EP | 1426650 A1 | 6/2004 |
| EP | 3070365 A1 | 9/2016 |
| JP | 1-65441 U | 4/1989 |
| JP | 271141 U | 5/1990 |
| JP | 06-010639 U | 2/1994 |
| JP | 2012-172832 A | 9/2012 |
| JP | 2015-025515 A | 2/2015 |
| JP | 2015-209965 A | 11/2015 |
| WO | 2015/068449 A1 | 5/2015 |

OTHER PUBLICATIONS

Search Report dated Mar. 2, 2018 from the State Intellectual Property Office of the P.R.C. in counterpart Application No. 201580022540.2.

* cited by examiner

VIBRATION-DAMPING DEVICE

TECHNICAL FIELD

The present invention relates to a vibration-damping device that is applied to, for example, automobiles, industrial machines, or the like, and absorbs and damps vibrations of vibration generating parts, such as engines.

Priority is claimed on Japanese Patent Application No. 2014-094160, filed on Apr. 30, 2014, the content of which is incorporated herein by reference.

BACKGROUND ART

For this type vibration-damping device, conventionally, a configuration including a tubular first attachment member that is coupled to any one of a vibration generating part and a vibration receiving part, a second attachment member that is coupled to the other thereof, an elastic body that couples the first attachment member and the second attachment member together, and a partitioning member that partitions a liquid chamber within the first attachment member having a liquid enclosed therein into a main liquid chamber having the elastic body as a portion of a wall surface thereof, and an auxiliary liquid chamber is known. A limiting passage that allows the main liquid chamber and the auxiliary liquid chamber to communicate with each other is formed in the partitioning member. In this vibration-damping device, when vibration is input, the vibration is absorbed and dampened by the first attachment member and the second attachment member being displaced relative to each other while the elastic body being elastically deforming and the liquid pressure of the main liquid chamber being fluctuated such that the liquid is circulated through the limiting passage.

In this vibration-damping device, when a load is input in a reverse direction due to the rebound of the elastic body, or the like after a large load (vibration) is input, due to, for example, irregularities of a road surface, or the like, and the liquid pressure of the main liquid chamber has increased rapidly, the main liquid chamber may have a negative pressure. Then, there is a possibility, for example, that abnormal noise resulting from cavitation collapse caused by generation of a negative pressure may be generated, or a load may be applied to the first attachment member and other components that constitute the other vibration-damping device.

Thus, for example as in a vibration-damping device shown in Patent Document 1, a configuration in which generation of a negative pressure in the main liquid chamber is prevented even when a large amplitude of vibration is input by providing a valve body within the limiting passage is known.

CITATION LIST

Patent Document

[Patent Document 1] Japanese Unexamined Patent Application, First Publication No. 2012-172832

SUMMARY OF INVENTION

Technical Problem

However, since the valve body is provided in the above related-art vibration-damping device, the structure thereof is complicated, and tuning of the valve body is also difficult. Additionally, for example when the valve body is opened suddenly, there is a possibility that damping performance may be affected, or desired properties may not obtained when the valve body deteriorates with the passage of time. Moreover, when the main liquid chamber has a negative pressure, there are also possibilities that abnormal noise, such as a striking sound accompanying, for example, the opening and closing of the valve body, may be generated and ride quality performance may be affected.

The present invention is made in view of the aforementioned circumstances, and an object thereof is to provide a vibration-damping device due to a simple structure that can be easily manufactured, and can prevent generation of a negative pressure in a main liquid chamber, and can exhibit a stable damping performance for a prolonged period of time while generation of abnormal noise is reduced.

Solution to Problem

A first aspect of the present invention is a vibration-damping device including a tubular first attachment member coupled to any one of a vibration generating part and a vibration receiving part, and a second attachment member coupled to the other thereof; an elastic body that couples the first attachment member and the second attachment member together; and a partitioning member that partitions a liquid chamber within the first attachment member having a liquid enclosed therein into a main liquid chamber having the elastic body as a portion of a wall surface thereof, and an auxiliary liquid chamber. A limiting passage that allows the main liquid chamber and the auxiliary liquid chamber to communicate with each other is formed in the partitioning member. An inner peripheral surface of the limiting passage is provided with a flow changing protrusion that protrudes toward an inner side in a radial direction of the limiting passage and that changes the flow of a liquid that flows into the limiting passage from the main liquid chamber and flows through the limiting passage in an axial direction of the limiting passage. In a vertical cross-sectional view passing through an axis of the limiting passage and through the flow changing protrusion, the limiting passage and the flow changing protrusion assume a symmetrical shape with respect to the axis. A protruding end of the flow changing protrusion forms an inner peripheral edge of a passage hole that is open on both sides in the axial direction.

Advantageous Effects of Invention

According to the vibration-damping device related to the present invention, manufacturing can be easily performed due to a simple structure, generation of a negative pressure in the main liquid chamber can be prevented, and a stable damping performance can be exhibited for a prolonged period of time while generation of abnormal noise is reduced.

DESCRIPTION OF EMBODIMENTS

First Embodiment

A first embodiment of a vibration-damping device related to the present invention will be described below, with reference to FIGS. 1 to 7.

Figure 1:
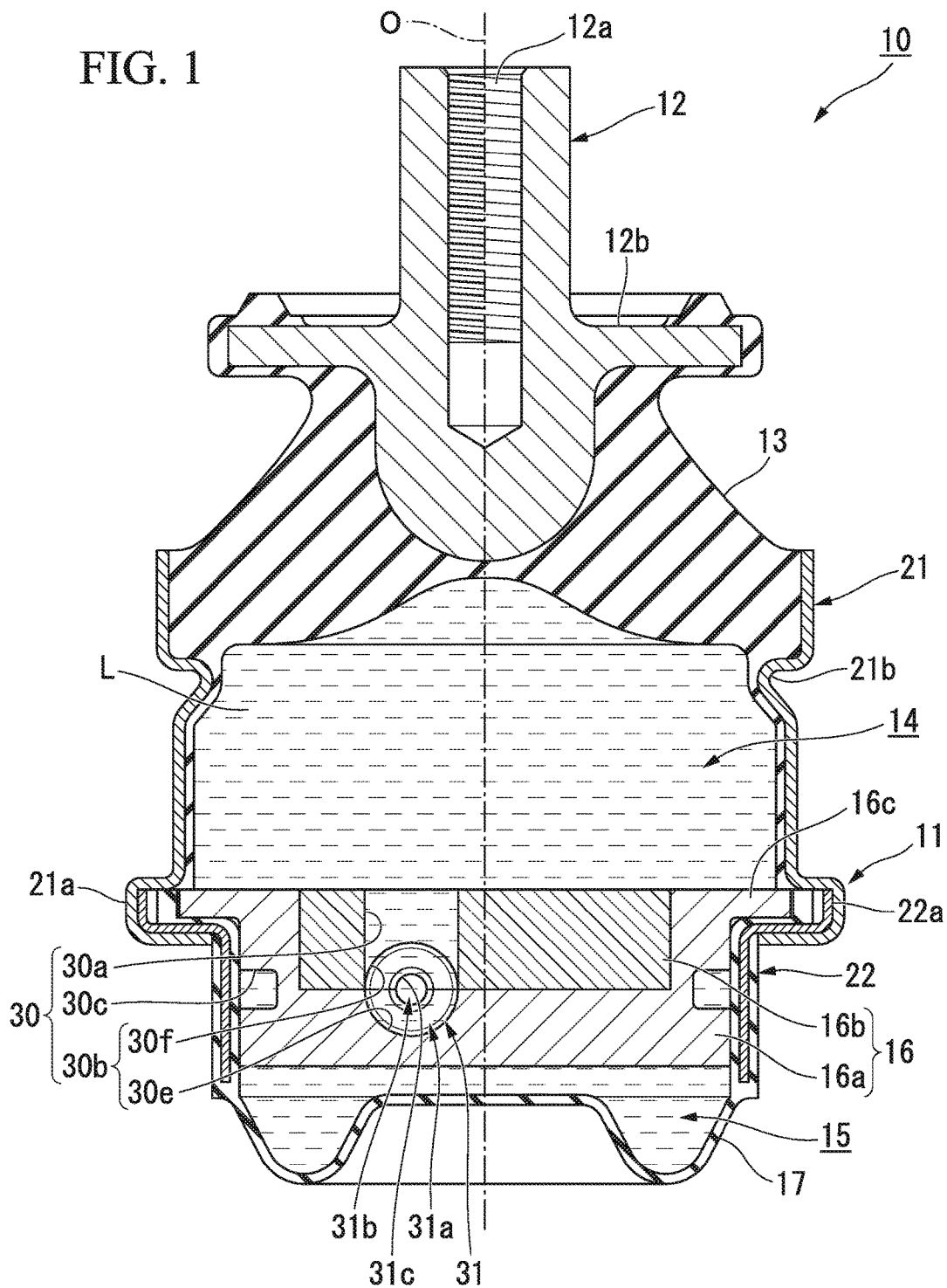
FIG. 1 is longitudinal sectional view of a vibration-damping device related to a first embodiment of the present invention.
Figure 2:
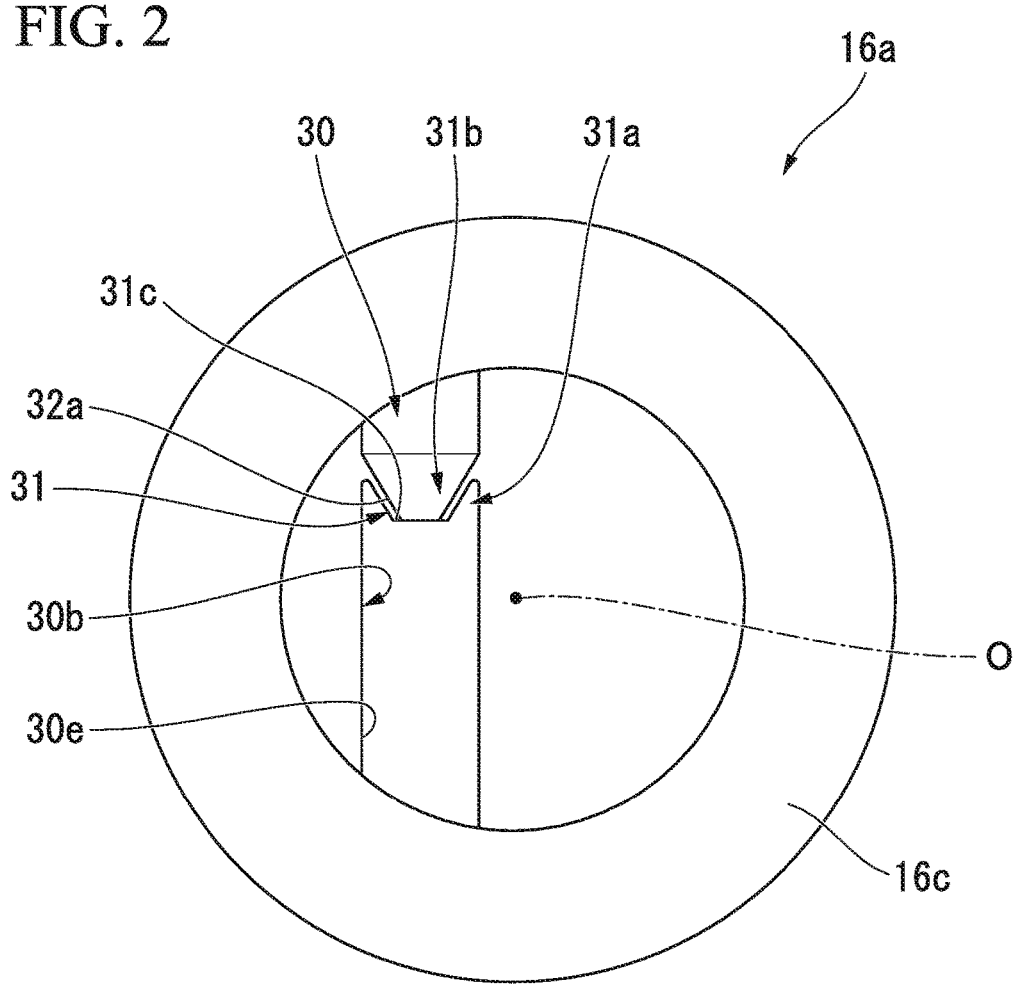
FIG. 2 is a plan view of a body part provided in a partitioning member that constitutes the vibration-damping device shown in FIG. 1.
Figure 3:
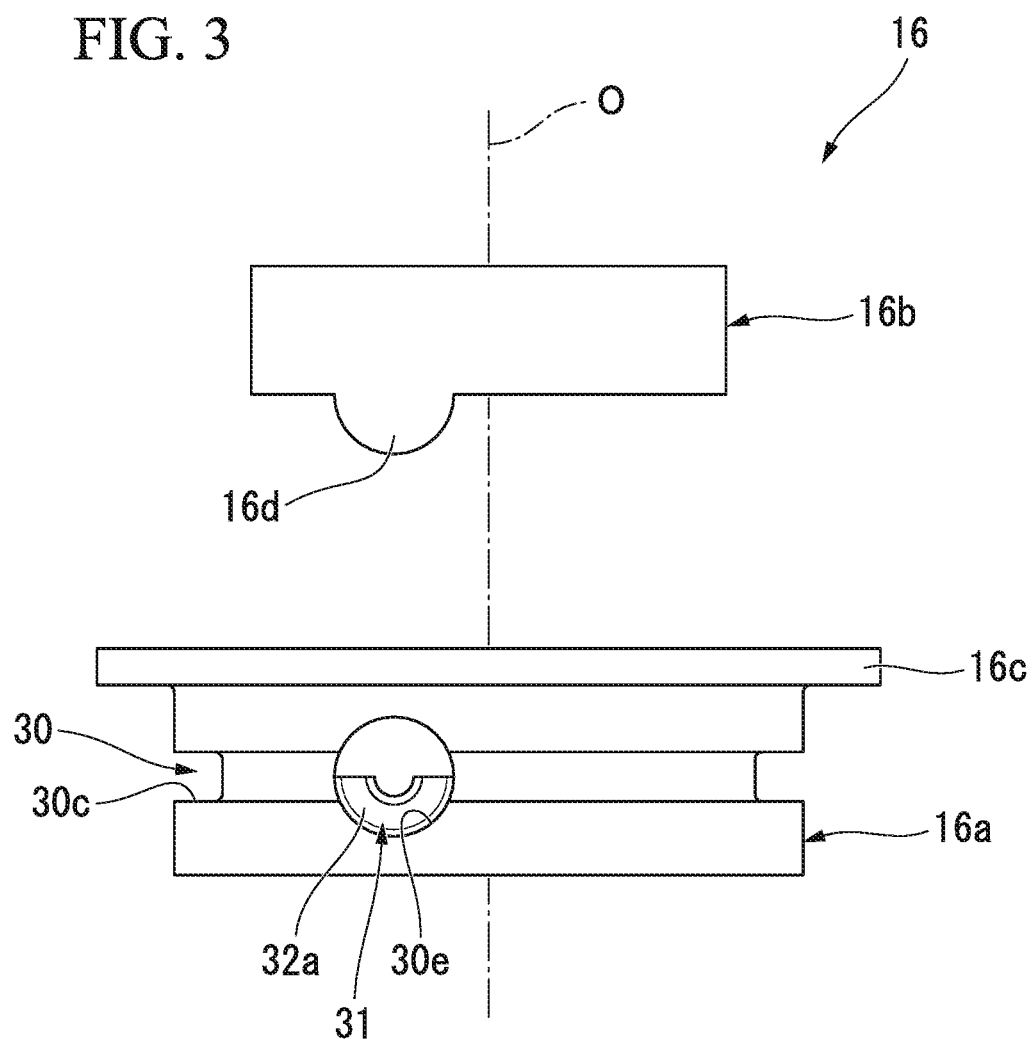
FIG. 3 is a front view showing a state where the partitioning member that constitutes the vibration-damping device shown in FIG. 1 is dissembled.

The vibration-damping device 10, as is shown in FIG. 1, includes a tubular first attachment member 11 that is coupled to any one of a vibration generating part and a vibration receiving part, a second attachment member 12 that is coupled to the other thereof, an elastic body 13 that couples the first attachment member 11 and the second attachment member 12 together, and a partitioning member 16 that partitions a liquid chamber within the first attachment member 11 in which a liquid L is enclosed, into a main liquid chamber (first liquid chamber) 14 that has the elastic body 13 in a portion of a wall surface thereof, and an auxiliary liquid chamber (second liquid chamber) 15.

In FIG. 1, the second attachment member 12 is formed in a pillar shape, the elastic body 13 is formed in a tubular shape, and the first attachment member 11, the second attachment member 12, and the elastic body 13 are disposed coaxially with a common axis. Hereinafter, this common axis is referred to as an axis O (an axis of the first attachment member), a main liquid chamber 14 side in a direction of the axis O is referred to as a first side, an auxiliary liquid chamber 15 side is referred to as a second side, a direction orthogonal to the axis O is referred to as a radial direction, and a direction going around the axis O is referred to as a circumferential direction.

In addition, in a case where the vibration-damping device 10 is mounted on, for example, an automobile, the second attachment member 12 is coupled to an engine serving as the vibration generating part and the first attachment member 11 is coupled to a vehicle body serving as the vibration receiving part via a bracket (not shown), whereby vibration of the engine is restrained from being transmitted to the vehicle body. The vibration-damping device 10 is of a liquid-enclosed type in which, for example, the liquid L, such as ethylene glycol, water, or silicone oil, is enclosed in the above liquid chamber of the first attachment member 11.

The first attachment member 11 includes a first outer tube body 21 located on a first side of the first attachment member 11 in the direction of the axis O, and a second outer tube body 22 located on a second side of the first attachment member 11 in the direction of the axis O.

The elastic body 13 is coupled to a first end of the first outer tube body 21 in a liquid-tight state, and a first opening of the first outer tube body 21 is blocked by the elastic body 13. A second end 21a of the first outer tube body 21 is formed with a greater diameter than other portions. The inside of the first outer tube body 21 is the main liquid chamber 14. The liquid pressure of the main liquid chamber 14 fluctuates when the elastic body 13 is deformed and the internal volume of the main liquid chamber 14 varies at the time of the input of vibration.

In addition, an annular groove 21b that extends continuously over the entire circumference thereof is formed in the portion of the first outer tube body 21 that is connected from a second side opposite to the portion thereof to which the elastic body 13 is coupled.

A diaphragm 17 is coupled to a second end of the second outer tube body 22 in a liquid-tight state, and a second opening of the second outer tube body 22 is blocked by the diaphragm 17. A first end 22a of the second outer tube body 22 is formed with a greater diameter than other portions, and is fitted into the second end 21a of the first outer tube body 21. Additionally, the partitioning member 16 is fitted into the second outer tube body 22, and the portion of the inside of the second outer tube body 22 between the partitioning member 16 and the diaphragm 17 is the auxiliary liquid chamber 15. The auxiliary liquid chamber 15 has the diaphragm 17 as a portion of a wall surface thereof, and is expanded and contracted when the diaphragm 17 is deformed. In addition, substantially the entire region of the second outer tube body 22 is covered by a rubber membrane formed integrally with the diaphragm 17.

A female thread part 12a is formed coaxially with the axis O in a first end surface of the second attachment member 12. The second attachment member 12 protrudes from the first attachment member 11 to the first side. A flange part 12b that protrudes toward an outer side in the radial direction and continuously extends over the entire circumference thereof is formed in the second attachment member 12. The flange part 12b is separated from a first end edge of the first attachment member 11 to the first side.

The elastic body 13 is formed of, for example, a rubber material or the like capable of being elastically deformed, and is formed in a tubular shape that has a gradually enlarged diameter from the first side toward the second side. A first end of the elastic body 13 is coupled to the second attachment member 12, and a second end thereof is coupled to the first attachment member 11.

In addition, substantially the entire region of an inner peripheral surface of the first outer tube body 21 of the first attachment member 11 is covered by the rubber membrane formed integrally with the elastic body 13.

As shown in FIGS. 1 to 4, the partitioning member 16 includes a body part 16a and a fitting part 16b. The body part 16a is formed in a bottomed tubular shape disposed coaxially with the axis O, and is fitted into the first attachment member 11. The body part 16a is provided with a flange part 16c that protrudes toward the outer side in the radial direction. The flange part 16c is provided at a first end of the body part 16a. The flange part 16c is disposed within a first end 22a of the second outer tube body 22.

The fitting part 16b is formed in a shape of a column disposed coaxially with the axis O, and is fitted into the body part 16a. An end surface of the fitting part 16b that faces the first side is flush with an end surface of the body part 16a that faces the first side. The size of the fitting part 16b in the direction of the axis O is equal to the size of a bottom part of the body part 16a in the direction of the axis O.

As shown in FIGS. 1 to 6, the partitioning member 16 is provided with a limiting passage 30 that allows the main liquid chamber 14 and the auxiliary liquid chamber 15 communicate with each other, and the main liquid chamber 14 and the auxiliary liquid chamber 15 communicate with each other only through the limiting passage 30. The limiting passage 30 causes liquid column resonance (resonance) with respect to an ordinary magnitude of vibration assumed to be input from the vibration generating part, that is, input of an ordinary vibration, such as an idle vibration (for example, the frequency thereof is 18 Hz to 30 Hz and the amplitude thereof is ±0.5 mm or less), or an engine shake vibration (for example, the frequency thereof is 14 Hz or less, and the amplitude thereof is greater than ±0.5 mm) of which the frequency is lower than the idle vibration. The resonant frequency of the limiting passage 30 is the frequency of the ordinary vibration. The resonant frequency of the limiting passage 30 is set (tuned) on the basis of, for example, the flow passage length and the flow passage cross-sectional area of the limiting passage 30.

Figure 4:
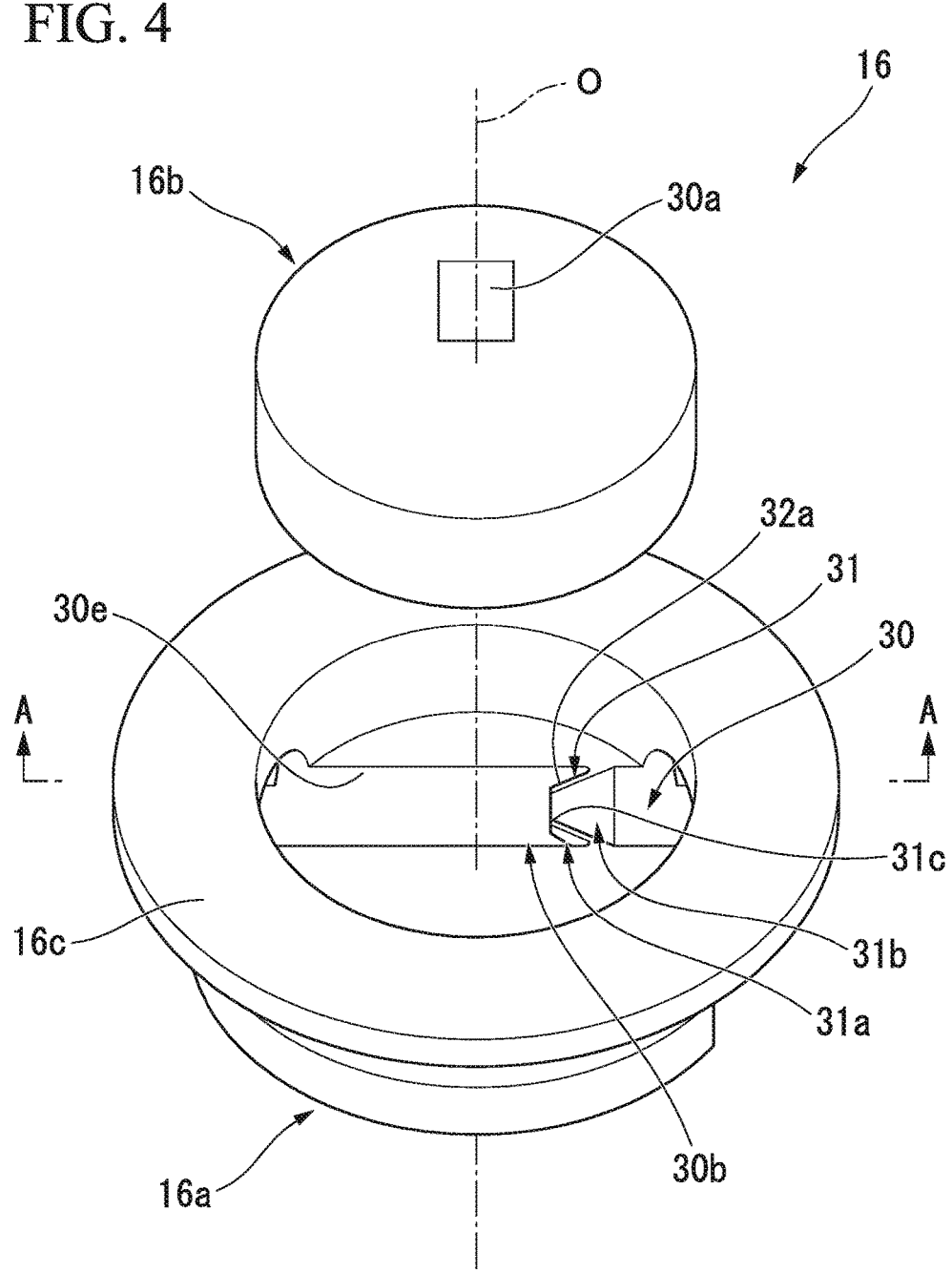
FIG. 4 is a perspective view showing a state where the partitioning member that constitutes the vibration-damping device shown in FIG. 1 is dissembled.
Figure 5:
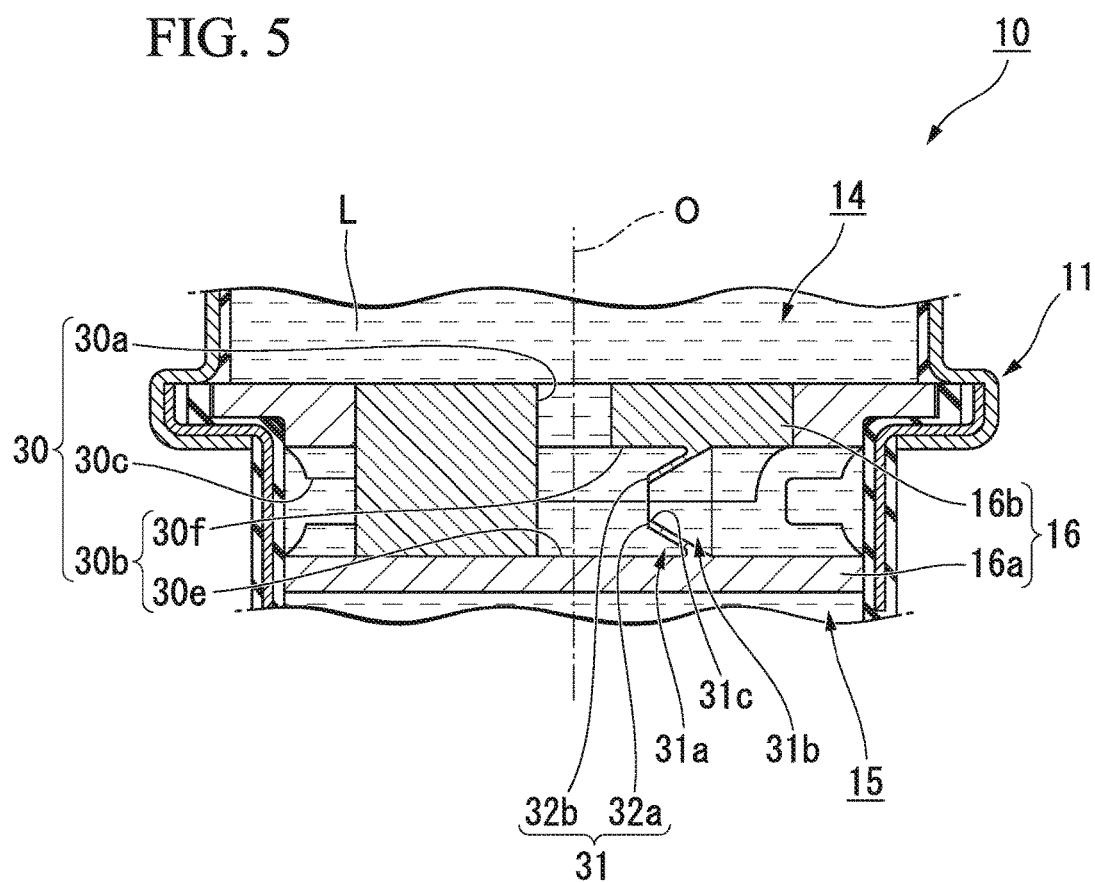
FIG. 5 is a sectional view of the vibration-damping device shown in FIG. 1, and is a sectional view equivalent to a section along line A-A shown in FIG. 4.
Figure 6:
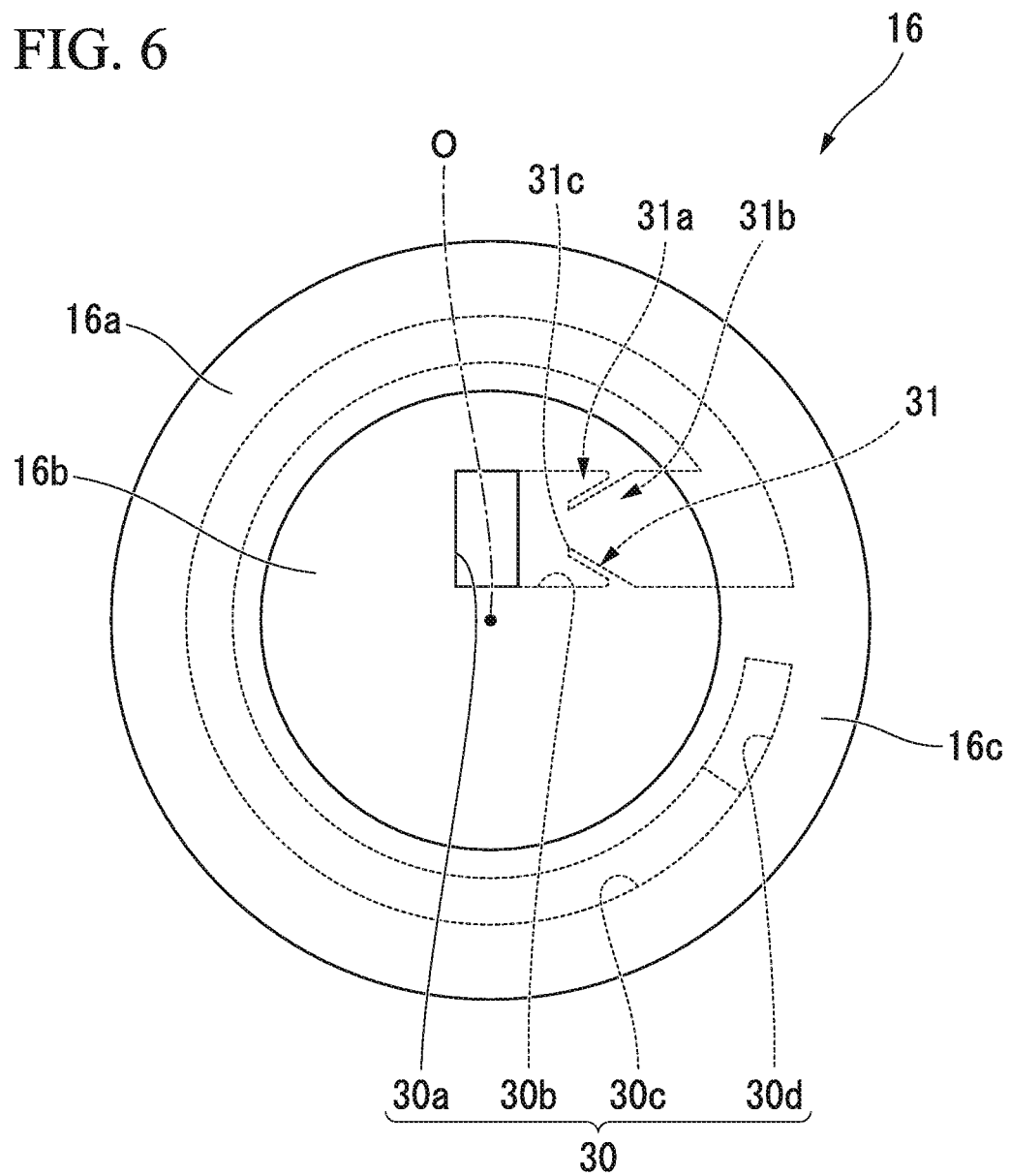
FIG. 6 is a plan view of the partitioning member that constitutes the vibration-damping device shown in FIG. 1.

As shown in FIGS. 4 to 6, the limiting passage 30 includes a main opening 30a, a linear passage part 30b, a circumferential groove part 30c, and a sub-opening 30d, which are lined up in this order from a main liquid chamber 14 side toward the auxiliary liquid chamber 15 side in an axial direction of the limiting passage 30.

The main opening 30a extends from an end surface of the partitioning member 16 that faces the first side toward the second side thereof, and linearly extends in the direction of the axis O in the example shown. The main opening 30a is disposed at a position offset with respect to the axis O. The second end of the main opening 30a does not reach an end surface of the partitioning member 16 that faces the second side, and the main opening 30a is a not open on the other side.

The linear passage part 30b extends from the second end of the main opening 30a toward a direction along an orthogonal plane orthogonal to the axis O, and is open from an outer peripheral surface of the partitioning member 16. The linear passage part 30b linearly extends along the above orthogonal plane. The linear passage part 30b is formed in a columnar shape, and an axis (hereinafter a "flow passage axis") M of the linear passage part 30b is located on the above orthogonal plane.

The circumferential groove part 30c extends in a circumferential direction from an end of the linear passage part 30b that is open on the outer peripheral surface of the partitioning member 16. The circumferential groove part 30c extends in the circumferential direction in the outer peripheral surface of the partitioning member 16, and is blocked from the outer side in the radial direction by an inner peripheral surface of the first attachment member 11.

The sub-opening 30d extends from an end of the circumferential groove part 30c on the auxiliary liquid chamber 15 side toward the second side, and is open on an end surface of the partitioning member 16 that faces the second side.

The main opening 30a of the limiting passage 30 is formed only in the fitting part 16b of the partitioning member 16, and the circumferential groove part 30c and the sub-opening 30d are formed only in the body part 16a of the partitioning member 16. The linear passage part 30b of the limiting passage 30 includes a first groove part 30e formed in the body part 16a, and a second groove part 30f formed in the fitting part 16b.

The first groove part 30e is formed in an end surface of the bottom part of the body part 16a that faces the first side, and the second groove part 30f is formed in an end surface of the fitting part 16b that faces the second side. The first groove part 30e and the second groove part 30f are formed with the same shape as each other and the same size as each other.

In addition, as shown in FIG. 4, the first groove part 30e is formed over the entire length in an axis direction (hereinafter "a flow passage axis M direction") of the linear passage part 30b in the bottom part of the body part 16a, and both ends of the linear passage part 30b in the flow passage axis M direction communicate with the circumferential groove part 30c. As shown in FIGS. 5 and 6, a first end of the first groove part 30e in the flow passage axis M direction is connected to an end of the circumferential groove part 30c in the circumferential direction, and a second end thereof in the flow passage axis M direction is connected to an intermediate part located between both ends of the circumferential groove part 30c in the circumferential direction. A portion of the first groove part 30e located on a first end side in the flow passage axis M direction constitutes the linear passage part 30b, and a protruding part 16d that protrude from the fitting part 16b toward the second side is liquid-tightly fitted into a portion of the first groove part 30e located on the second end side in the flow passage axis M direction. The protruding part 16d restricts that the linear passage part 30b is short-circuited to the above intermediate part of the circumferential groove part 30c.

Figure 7:
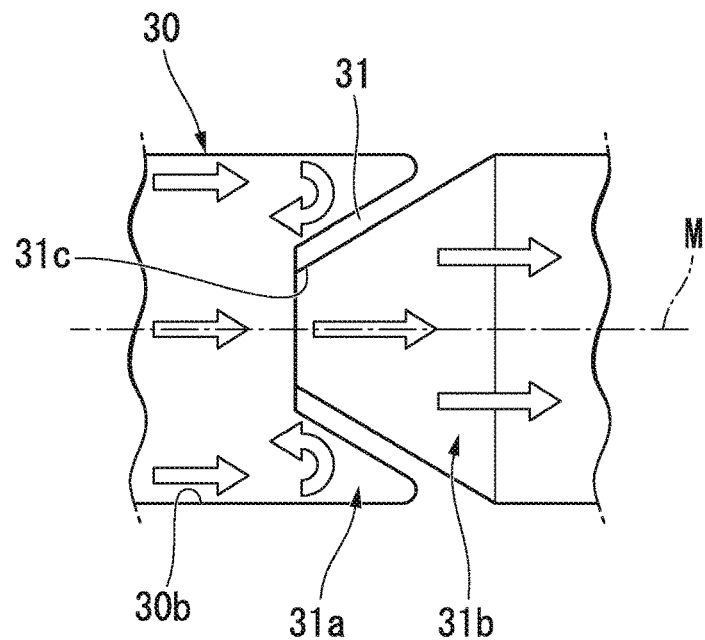
FIG. 7 is a view showing a flow changing space and a passage space that are provided in the partitioning member that constitutes the vibration-damping device shown in FIG. 1.

In the present embodiment, as shown in FIGS. 5 to 7, an inner peripheral surface of the limiting passage 30 is provided with a flow changing protrusion 31 that changes the flow of the liquid L that flows into the limiting passage 30 from the main liquid chamber 14.

The flow changing protrusion 31 protrudes from the inner peripheral surface of the limiting passage 30 toward a radial inner side of the limiting passage 30, and changes the flow of the liquid L that flows into the limiting passage 30 from the main liquid chamber 14 and flows through the limiting passage 30 in the axial direction of the limiting passage 30. The flow changing protrusion 31 makes the liquid L that flows through the limiting passage 30 flow along the surface of the flow changing protrusion 31, thereby bending the flow of the liquid L. The flow changing protrusion 31 is formed integrally with the partitioning member 16 as a rigid body having rigidity such that the flow changing protrusion 31 is not deformed when the flow of the liquid L is received using, for example, a resin material or the like.

The flow changing protrusion 31 is provided within the linear passage part 30b over the entire length in the flow passage axis M direction, and changes the flow of the liquid L that flows through the linear passage part 30b in the flow passage axis M direction, to a radial direction (hereinafter a "flow passage radial direction") of the linear passage part 30b.

Additionally, in the present embodiment, as shown in FIGS. 5 and 6, the limiting passage 30 and the flow changing protrusion 31 have a symmetrical shape with respect to the flow passage axis M in a vertical sectional view passing through the flow passage axis M and the flow changing protrusion 31. The limiting passage 30 and the flow changing protrusion 31 are linearly symmetrical as the flow passage axis M as a reference in the above vertical sectional view. The flow changing protrusion 31 is disposed over the entire circumference of the flow passage axis M, and continuously extends over the entire circumference of the flow passage axis M in the example shown.

The flow changing protrusion 31 is formed in a tubular shape that extends in the flow passage axis M direction, and is formed in a cylindrical shape in the example shown. A first end of the flow changing protrusion 31 located on the auxiliary liquid chamber 15 side in the flow passage axis M direction is a base end (fixed end) coupled to the inner peripheral surface of the limiting passage 30, and a second end thereof in the flow passage axis M direction is a protruding end (free end) non-coupled to the inner peripheral surface of the limiting passage 30. A passage hole 31c that is an opening on a protruding end (free end) side of the flow changing protrusion 31 faces the main liquid chamber 14 side in the flow passage axis M direction.

An outer peripheral surface of the flow changing protrusion 31 gradually decreases in diameter from the base end toward the protruding end, and is linearly inclined with respect to the flow passage axis M in the above vertical sectional view. In addition, in the present embodiment, an inner peripheral surface of the flow changing protrusion 31 also gradually decreases in diameter from the base end toward the protruding end, and the overall flow changing protrusion 31 gradually decreases in diameter from the base end toward the protruding end.

The protruding end of the flow changing protrusion 31 forms an inner peripheral edge of the passage hole 31c that is open on both sides in the flow passage axis M direction. In the example shown, the overall opening on a protruding end side of the flow changing protrusion 31 is the passage hole 31c, and the protruding end of the flow changing protrusion 31 constitutes the overall inner peripheral edge of the passage hole 31c.

The flow changing protrusion 31 partitions the inside of the limiting passage 30 into a flow changing space 31a where the flow of the liquid L that flows into the limiting passage 30 is changed, and a passage space 31b through which the liquid L that flows into the limiting passage 30 is passed. The flow changing protrusion 31 forms the flow changing space 31a between the flow changing protrusion 31 and an inner peripheral surfaces of the limiting passage 30, and the flow changing space 31a is formed between the outer peripheral surface of the flow changing protrusion 31 and an inner peripheral surface of the linear passage part 30b that is the inner peripheral surface of the limiting passage 30. The outer peripheral surface of the flow changing protrusion 31 is a defining surface that defines the flow changing space 31a, and this defining surface is inclined with respect to the flow passage axis M in the above vertical sectional view.

The flow changing space 31a is formed in a ring shape coaxial with the flow passage axis M, and is open on the main liquid chamber 14 side in the flow passage axis M direction. In the above vertical sectional view, the space width of the flow changing space 31a in the flow passage radial direction gradually decreases from the main liquid chamber 14 side toward the auxiliary liquid chamber 15 side in the flow passage axis M direction. A bottom surface of the flow changing space 31a faces the main liquid chamber 14 side in the flow passage axis M direction and couples together the outer peripheral surface of the flow changing protrusion 31 and the inner peripheral surface of the linear passage part 30b. In the above vertical sectional view, the bottom surface of the flow changing space 31a is formed in the shape of a concavely curved surface that becomes concave toward the auxiliary liquid chamber 15 side in the flow passage axis M direction.

The passage space 31b includes the passage hole 31c. The passage space 31b is formed by the inner peripheral surface of the flow changing protrusion 31, and is constituted by the overall inside of the flow changing protrusion 31. The passage space 31b is formed in the shape of a frustum coaxial with the flow passage axis M, and in the example shown, in the shape of a truncated cone, and is open on both sides in the flow passage axis M direction. The passage space 31b is gradually increased in diameter from the main liquid chamber 14 side toward the auxiliary liquid chamber 15 side in the flow passage axis M direction.

In addition, in the example shown, the flow changing protrusion 31 is split into two in the direction of the axis O, and each flow changing protrusion 31 is constituted of a first split protrusion 32a on the second side, and a second split protrusion 32b on the first side. The first split protrusion 32a and the second split protrusion 32b are formed with the same shape as each other and with the same size as each other, and the flow changing protrusion 31 is equally divided into two in the direction of the axis O along the above orthogonal plane. The first split protrusion 32a is disposed within the first groove part 30e and is formed integrally with the body part 16a, and the second split protrusion 32b is disposed within the second groove part 30f and is formed integrally with the fitting part 16b.

In the vibration-damping device 10, when vibration is input, the first attachment member 11 and the second attachment member 12 are displaced relative to each other while elastically deforming the elastic body 13 and the liquid pressure of the main liquid chamber 14 fluctuates. Accordingly, the liquid L flows into the limiting passage 30 from the main liquid chamber 14, and flows between the main liquid chamber 14 and the auxiliary liquid chamber 15 through the limiting passage 30. When the liquid L flows into the linear passage part 30b from the main opening 30a of the limiting passage 30, flows through the linear passage part 30b in the flow passage axis M direction, and reaches a portion within the linear passage part 30b where the flow changing protrusion 31 is located, the liquid L that flows through an outer side in the flow passage radial direction within the linear passage part 30b of the liquid L that flows through the linear passage part 30b, flows into the flow changing space 31a, flows toward the protruding end side of the flow changing protrusion 31 along the surface of the flow changing protrusion 31, and flow is changed to an inner side in the flow passage radial direction. In this case, by changing the flow of the liquid L that flows into the flow changing space 31a so as to run along the outer peripheral surface of the flow changing protrusion 31, the liquid L can be swirled with a circumference extending around the flow passage axis M as a swirling axis. Additionally, the liquid L that flows through the inner side in the flow passage radial direction within the linear passage part 30b of the liquid L that flows through the linear passage part 30b, passes through the passage hole 31c in the flow passage axis M direction.

In this case, if the flow speed of the liquid L is increased, the pressure loss of the liquid L is raised due to, for example, an energy loss resulting from the collision between the liquid L that passes through the passage hole 31c in the flow passage axis M direction, and the liquid L, the flow of which is changed by the flow changing protrusion 31, an energy loss caused by changing the viscous resistance of the liquid L and the flow of the liquid L and forming a swirling flow, an energy loss caused by the friction between the liquid L and the flow changing protrusion 31, or the like.

Here, in the vibration-damping device 10, the limiting passage 30 and the flow changing protrusion 31 have a symmetrical shape with respect to the flow passage axis M in the above vertical sectional view. Thus, in this vertical sectional view, the flows of the respective liquids L that flow through portions located on both outsides in the flow passage radial direction are symmetrically changed with respect to the flow passage axis M by the flow changing protrusion 31. Since the liquid L, the flow of which is changed in this way collides against the liquid L that passes through the passage hole 31c in the flow passage axis M direction, from outside in both flow passage radial directions, the pressure loss of the liquid L is increased effectively.

On the other hand, if the flow speed of the liquid L is low, the pressure loss of the liquid L caused by the collision between the above liquids L as mentioned above is suppressed, and the liquid L smoothly flows through the limiting passage 30.

When an ordinary vibration, such as an engine shake vibration or an idle vibration, is input to the vibration-damping device 10, compared to a case where large vibration with a larger amplitude than this ordinary vibration is input, the quantity of the liquid L that flows into the limiting passage 30 from the main liquid chamber 14 per unit time becomes small, and the flow speed of the liquid L that flows through the limiting passage 30 is suppressed. Therefore, the pressure loss of the liquid L is suppressed as mentioned above, it is possible to smoothly circulate the liquid L within the limiting passage 30 to make the liquid actively communicate between the main liquid chamber 14 and the auxiliary liquid chamber 15. As a result, resonance can be caused within the limiting passage 30, and this vibration can be absorbed and dampened effectively.

On the other hand, when large vibration is input to the vibration-damping device 10, the quantity of the liquid that flows into the limiting passage 30 from the main liquid chamber 14 per unit time becomes large. As a result, since the flow speed of the liquid L that flows into the limiting passage 30 from the main liquid chamber 14 is increased, a large pressure loss can be caused in the liquid L as mentioned above. Accordingly, it is possible to reduce the flow speed of the liquid L that flows into the limiting passage 30 from the main liquid chamber 14 and to suppress the liquid L from flowing through the limiting passage 30 between the main liquid chamber 14 and the auxiliary liquid chamber 15. As a result, liquid pressure fluctuation of the main liquid chamber 14 can be suppressed, and generation of a local negative pressure in the main liquid chamber 14 can be prevented.

Moreover, since a large pressure loss can be caused in the liquid L that flows into the limiting passage 30 from the main liquid chamber 14, it is possible to limit the liquid L from flowing into the limiting passage 30 from the main liquid chamber 14 when a load in a direction in which the liquid pressure of the main liquid chamber 14 increases is input in a process in which a large vibration is input to the vibration-damping device 10. Accordingly, it is possible to enlarge the positive pressure within the main liquid chamber 14. As a result, it is possible to prevent the negative pressure within the main liquid chamber 14 from becoming large when a load in a direction in that the liquid pressure of the main liquid chamber 14 falls is input next.

As described above, according to the vibration-damping device 10 related to the present embodiment, the flow changing protrusion 31 is provided instead of the valve body like the above related art. Thus, when ordinary vibration is input, this vibration is absorbed and dampened, and when a large vibration is input, it is possible to prevent generation of a negative pressure in the main liquid chamber 14, manufacturing can be easily performed due to a simple structure, and a stable damping performance can be exhibited for a prolonged period of time.

Additionally, in the vibration-damping device 10, it is not necessary to install a movable member like the valve body shown in the above related art, it is possible to reduce abnormal noise resulting from generation of a negative pressure in the main liquid chamber 14, such as abnormal noise accompanying the operation of the movable member or generation of striking sound occurring between the movable member and a fixing member to which this movable member is fixed. As a result, the vibration-damping device 10 that is excellent in ride quality performance can be provided.

Additionally since the flow changing protrusion 31 partitions the inside of the limiting passage 30 into the flow changing space 31a and the passage space 31b, it is possible to limit the influence from the liquid L that passes through the passage space 31b, thereby precisely changing the flow of the liquid L that has flowed into the flow changing space 31a. As a result, when the flow speed of the liquid L is increased, the pressure loss of the liquid L can be increased reliably.

Additionally, since the flow changing space 31a is formed between the outer peripheral surface of the flow changing protrusion 31 and the inner peripheral surface of the limiting passage 30, the flow changing space 31a can be formed over the entire circumference of the flow passage axis M. Accordingly, the flow of the liquid L that flows through the outer side in the flow passage radial direction within the linear passage part 30b of the liquid L that flows through the linear passage part 30b, can be changed over the entire circumference of the flow passage axis M. As a result, when the flow speed of the liquid L is increased, the pressure loss of the liquid L can be increased much more reliably.

Additionally, since the passage space 31b is formed by the inner peripheral surface of the flow changing protrusion 31, the passage space 31b can be made to be open on both sides in the flow passage axis M direction. Accordingly, it is possible to circulate the liquid L that passes through the passage space 31b in the flow passage axis M direction within the passage space 31b. As a result, the liquid L can be smoothly circulated within the passage space 31b.

Additionally, the outer peripheral surface of the flow changing protrusion 31 gradually decreases in diameter from the base end toward the protruding end. Therefore, by changing the flow of the liquid L that flows into the flow changing space 31a so as to run along the outer peripheral surface of the flow changing protrusion 31, the liquid L can be swirled with the circumference extending around the flow passage axis M as a swirling axis, and the direction of flow of the liquid L can be reversed in the flow passage axis M direction. Accordingly, the pressure loss of the liquid L caused when the liquid L that passes through the passage hole 31c in the flow passage axis M direction collides against the liquid L, the flow of which is changed by the flow changing protrusion 31 can be increased much more reliably.

In addition, in the present embodiment, the inner peripheral surface of the flow changing protrusion 31 also gradually decreases in diameter from the base end toward the protruding end, and the overall flow changing protrusion 31 gradually decreases in diameter from the base end toward the protruding end. Therefore, when the liquid L that flows into the passage space 31b from the passage hole 31c flows through the passage space 31b in the flow passage axis M direction, it is possible to limit the energy loss resulting from the friction between this liquid L and the inner peripheral surface of the flow changing protrusion 31. As a result, the liquid L can be still more smoothly circulated within the passage space 31b.

Second Embodiment

Next, a second embodiment of the vibration-damping device related to the present invention will be described with reference to FIGS. 8 and 9.

In addition, in the second embodiment, the same portions as the constituent elements in the first embodiment will be designated by the same reference signs and a description thereof will be omitted, and only different points will be described.

In the vibration-damping device of the present embodiment, a flow changing protrusion 36 is formed in a plate shape that protrudes from the inner peripheral surface of the limiting passage 30, instead of being formed in a tubular shape that extends in the flow passage axis M direction. The flow changing protrusion 36 is intermittently disposed over the entire circumference of the flow passage axis M, and a pair of the flow changing protrusions are formed with the flow passage axis M being interposed therebetween in the example shown. The flow changing protrusions 36 are formed with the same shape as each other and with the same size as each other.

Figure 9:
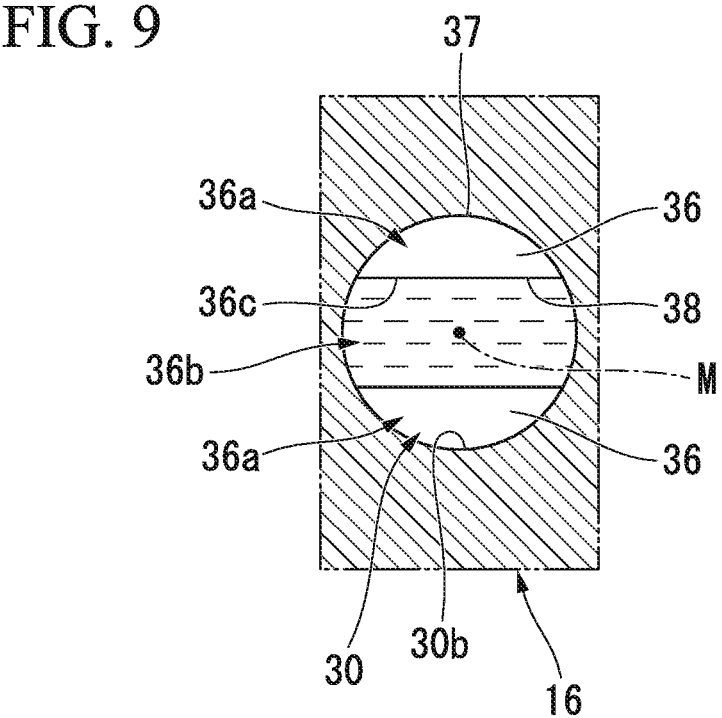
FIG. 9 is a sectional view as seen in the direction of arrow B-B shown in FIG. 8.

As shown in FIG. 9, each flow changing protrusion 36 assumes a semicircular shape in a cross-sectional view of the limiting passage 30 orthogonal to the flow passage axis M, and an outer peripheral edge of the flow changing protrusion 36 is constituted of a coupling part 37 and a connecting part 38. The coupling part 37 extends in a circular-arc shape around the flow passage axis M. The coupling part 37 is continuously coupled to the inner peripheral surface of the linear passage part 30b, which is the inner peripheral surface of the limiting passage 30, over the entire length around the flow passage axis M. The connecting part 38 extends linearly and connects both ends of the coupling part 37 around the flow passage axis M together. The pair of flow changing protrusions 36 are symmetrically disposed with the flow passage axis M being interposed therebetween in the above cross-sectional view, and the pair of entire flow changing protrusions 36 face each other in the flow passage radial direction.

Figure 8:
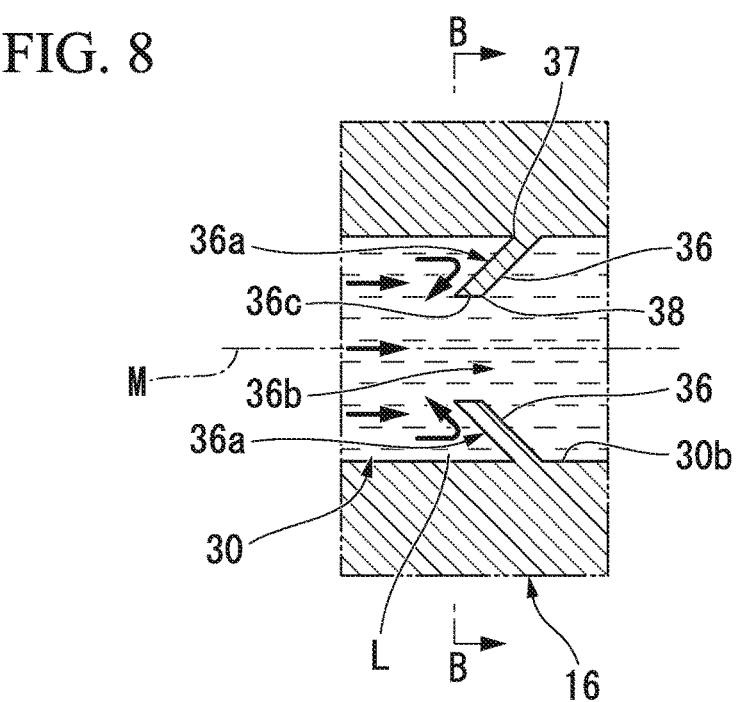
FIG. 8 is longitudinal sectional view, which is an enlarged view of main parts, of a vibration-damping device related to a second embodiment of the present invention.

As shown in FIG. 8, the limiting passage 30 and the flow changing protrusions 36 have a symmetrical shape with respect to the flow passage axis M in a vertical sectional view passing through the flow passage axis M and a central part of the coupling part 37 around the flow passage axis M. Each flow changing protrusion 36 protrudes being inclined in the flow passage axis M direction from the inner peripheral surface of the linear passage part 30b, in the above vertical sectional view.

In this vibration-damping device, a passage hole 36c is formed between protruding ends of the pair of flow changing protrusions 36. The passage hole 36c is formed in the shape of an elongated hole between the connecting parts 38 in the above cross-sectional view. Additionally, the flow changing space 36a is open only on the main liquid chamber 14 side in the flow passage axis M direction, and is formed between the surface of each flow changing protrusion 36 and the inner peripheral surface of the linear passage part 30b.

Moreover, the passage space 36b is open on both sides in the flow passage axis M direction, and a portion of a wall surface of the passage space 36b is constituted by the surface of each flow changing protrusion 36.

In addition, as shown in FIG. 9, in the present embodiment, the pair of flow changing protrusions 36 are symmetrically disposed with the flow passage axis M being disposed therebetween in the above cross-sectional view. However, the present invention is not limited to this, and other forms in which at least portions of the pair of flow changing protrusions face each other in the flow passage radial direction may be employed.

Third Embodiment

Next, a third embodiment of the vibration-damping device related to the present invention will be described with reference to FIG. 10.

In the third embodiment, the same portions as the constituent elements in the first embodiment will be designated by the same reference signs and a description thereof will be omitted, and only different points will be described.

In the vibration-damping device of the present embodiment, a flow changing protrusion 41 is formed in an annular shape that is open on the flow passage axis M direction, instead of being formed in a tubular shape that extends in the flow passage axis M direction. The flow changing protrusion 41 continuously extends over the entire circumference around the flow passage axis M.

Figure 10:
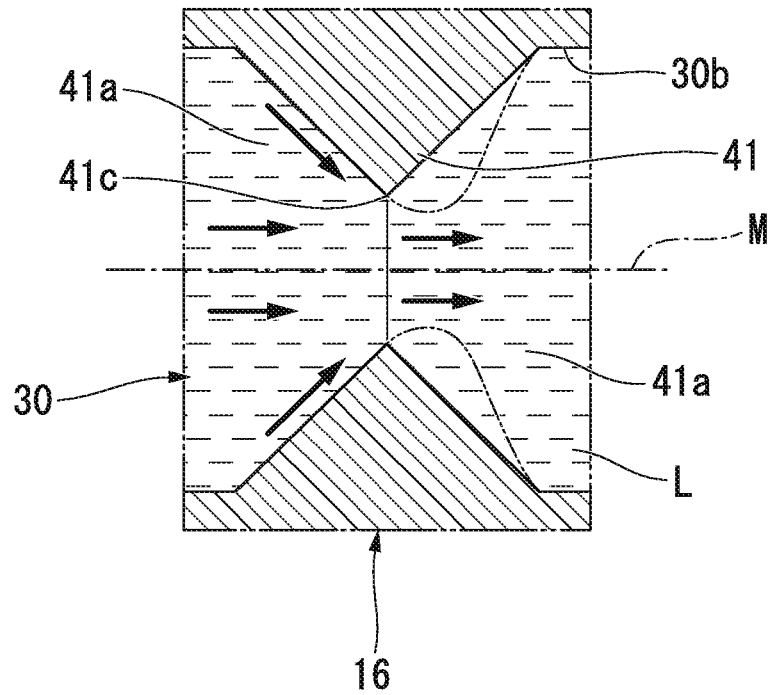
FIG. 10 is longitudinal sectional view, which is an enlarged view of main parts, of a vibration-damping device related to a third embodiment of the present invention.

The flow changing protrusion 41 is formed such that the size thereof in the flow passage axis M direction becomes small from both sides in the flow passage axis M direction gradually from the base end toward the protruding end, assumes a triangular shape that becomes convex toward the inner side in the flow passage radial direction in the above vertical sectional view, and in the example shown in FIG. 10, an isosceles triangular shape. End surfaces of the flow changing protrusion 41 that face the flow passage axis M direction are all inclined surface that are inclined with respect to the flow passage axis M, in the above vertical sectional view.

In this vibration-damping device, a passage hole 41c is the inside of the flow changing protrusion 41, and the above flow changing space and the above passage space are not partitioned within the linear passage part 30b. The inside of the linear passage part 30b is partitioned into a pair of partition spaces 41a by the flow changing protrusion 41. The partition spaces 41a are located on both sides with the flow changing protrusion 41 being disposed therebetween in the flow passage axis M direction, and communicate with each other through the passage hole 41c.

When vibration is input to this vibration-damping device and the liquid L flows through the limiting passage 30 between the main liquid chamber 14 and the auxiliary liquid chamber 15, the liquid L that flows through the outer side in the flow passage radial direction within the linear passage part 30b of the liquid L that flows through the linear passage part 30b, flows from the base end toward the protruding end along the end surfaces of the flow changing protrusion 41, and thereby the flow of the liquid is changed to the inner side in the flow passage radial direction. Additionally, the liquid L that flows through the inner side in the flow passage radial direction within the linear passage part 30b of the liquid L that flows through the linear passage part 30b, passes through the passage hole 41c in the flow passage axis M direction.

Accordingly, if the flow speed of the liquid L is increased, the pressure loss of the liquid L is raised due to, for example, an energy loss resulting from the collision between the liquid L that passes through the passage hole 41c in the flow passage axis M direction, and the liquid L, the flow of which is changed by the flow changing protrusion 41. In this case, the liquid L does not easily flow into a region of the linear passage part 30b between a two-dot chain line shown in FIG. 10 and the inner peripheral surface of the linear passage part 30b, and separation of a flow occurs. Therefore, the pressure loss of the liquid L is increased even by the effective sectional area of the limiting passage 30 decreasing within the partition spaces 41a of the linear passage part 30b.

Fourth Embodiment

Next, a fourth embodiment of the vibration-damping device related to the present invention will be described with reference to FIG. 11.

In addition, in the fourth embodiment, the same portions as the constituent elements in the third embodiment will be designated by the same reference signs and a description thereof will be omitted, and only different points will be described.

Figure 11:
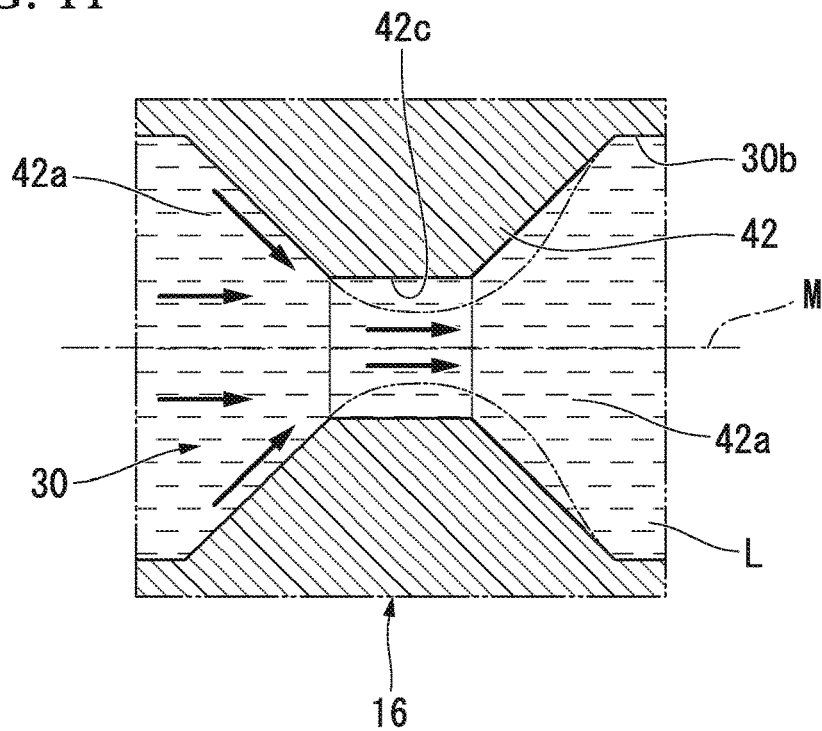
FIG. 11 is longitudinal sectional view, which is an enlarged view of main parts, of a vibration-damping device related to a fourth embodiment of the present invention.

In the vibration-damping device of the present embodiment, a flow changing protrusion 42 is formed in a trapezoidal shape that becomes convex toward the inner side in the flow passage radial direction, and in the example shown in FIG. 11, in the shape of an isosceles trapezoid, in the above vertical sectional view. The passage hole 42c is formed in a columnar shape.

Even in this vibration-damping device, similar to the vibration-damping device related to the above third embodiment, separation of a flow occurs, the liquid L does not easily flow into a region of the linear passage part 30b between a two-dot chain line shown in FIG. 11 and the inner peripheral surface of the linear passage part 30b, and the effective sectional area of the limiting passage 30 decreases. Here, in the present embodiment, since the passage hole 42c is formed in a columnar shape, separation of the liquid occurs in both of the partition space 42a and the passage hole 42c of the linear passage part 30b, and the pressure loss of the liquid L is increased effectively.

Fifth Embodiment

Figure 12:
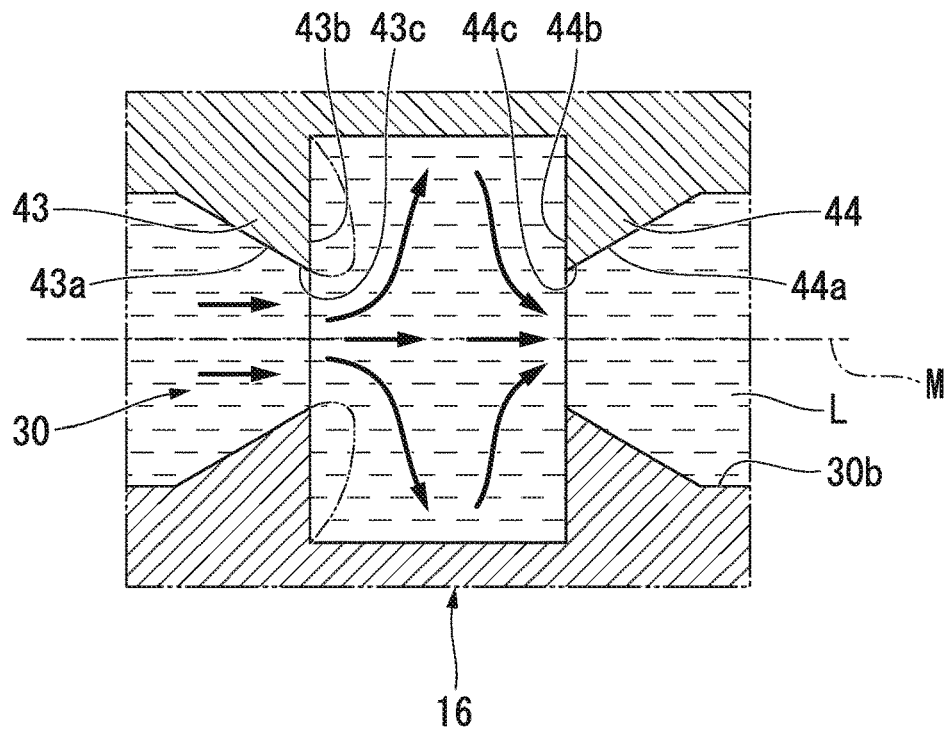
FIG. 12 is longitudinal sectional view, which is an enlarged view of main parts, of a vibration-damping device related to a fifth embodiment of the present invention.

Next, a fifth embodiment of the vibration-damping device related to the present invention will be described with reference to FIG. 12.

In addition, in the fifth embodiment, the same portions as the constituent elements in the third embodiment will be designated by the same reference signs and a description thereof will be omitted, and only different points will be described.

In the vibration-damping device of the present embodiment, a pair of flow changing protrusions 43 and 44 is provided at a distance from each other in the flow passage axis M direction within the linear passage part 30b, and an intermediate part of the linear passage part 30b in the flow passage axis M direction, which is located between the flow changing protrusions 43 and 44, has a greater diameter than each portion located on the outside in the flow passage axis M direction with respect to this intermediate part.

The flow changing protrusions 43 and 44 are formed in the shape of a right-angled triangle that becomes convex toward the inner side in the flow passage radial direction, in the above vertical sectional view. End surfaces of the flow changing protrusions 43 and 44 are provided with inclined end surfaces 43a and 44a that are inclined with respect to the flow passage axis M in the above vertical sectional view, and orthogonal end surfaces 43b and 44b that are orthogonal to the flow passage axis M in the above vertical sectional view.

Here, in the present embodiment, one first flow changing protrusion 43 and one second flow changing protrusion 44 are provided as the above flow changing protrusion. The first flow changing protrusion 43 is provided on the main liquid chamber 14 side in the flow passage axis M direction, and the inclined end surface 43a of the first flow changing protrusion 43 faces the main liquid chamber 14 side in the flow passage axis M direction. A first passage hole 43c serving as the above passage hole is provided inside the first flow changing protrusion 43. The second flow changing protrusion 44 is provided on the auxiliary liquid chamber 15 side in the flow passage axis M direction, and the inclined end surface 44a of the second flow changing protrusion 44 faces the auxiliary liquid chamber 15 side in the flow passage axis M direction. The second passage hole 44c serving as the above passage hole is provided inside the second flow changing protrusion 44.

When vibration is input to this vibration-damping device and the liquid L flows through the limiting passage 30 from the main liquid chamber 14 toward the auxiliary liquid chamber 15, the liquid L that flows through the outer side in the flow passage radial direction within the linear passage part 30b of the liquid L that has flowed into the linear passage part 30b from the main opening 30a, flows from the base end toward the protruding end along the inclined end surface 43a of the first flow changing protrusion 43. Therefore, the flow of the liquid L is changed toward the inner side in the flow passage radial direction. Additionally, the liquid L that flows through the inner side in the flow passage radial direction within the linear passage part 30b of the liquid L that has flowed into the linear passage part 30b, passes through the first passage hole 43c in the flow passage axis M direction.

Accordingly, if the flow speed of the liquid L is increased, the pressure loss of the liquid L is increased due to, for example, an energy loss resulting from the collision between the liquid L that has flowed into the first passage hole 43c in the flow passage axis M direction, and the liquid L, the flow of which is changed by the first flow changing protrusion 43, reduction (refer to a two-dot chain line shown in FIG. 12) of effective sectional area resulting from separation of a flow in the intermediate part of the linear passage part 30b in the flow passage axis M direction, or the liked.

Here, the intermediate part of the linear passage part 30b in the flow passage axis M direction has a greater diameter than other portions. Thus, if the liquid L passes through the first passage hole 43c and flows into the intermediate part of the linear passage part 30b, the liquid L that flows through the outer side in the flow passage radial direction within the linear passage part 30b of the above liquid L, flows in the flow passage axis M direction, widening to the outer side in the flow passage radial direction so as to run along an inner peripheral surface of the intermediate part. As a result, when the liquid L passes through the second passage hole 44c from the intermediate part, the liquid L that flows through the outer side in the flow passage radial direction within the linear passage part 30b of the above liquid L, flows from the base end toward the protruding end along the orthogonal end surface 44b of the second flow changing protrusion 44, and thereby the flow of the liquid L is changed toward the inner side in the flow passage radial direction.

Accordingly, if the flow speed of the liquid L is increased, the pressure loss of the liquid L is increased due to, for example, an energy loss resulting from the collision between the liquid L that passes through the second passage hole 44c in the flow passage axis M direction, and the liquid L, the flow of which is changed by the second flow changing protrusion 44.

Sixth Embodiment

Figure 13:
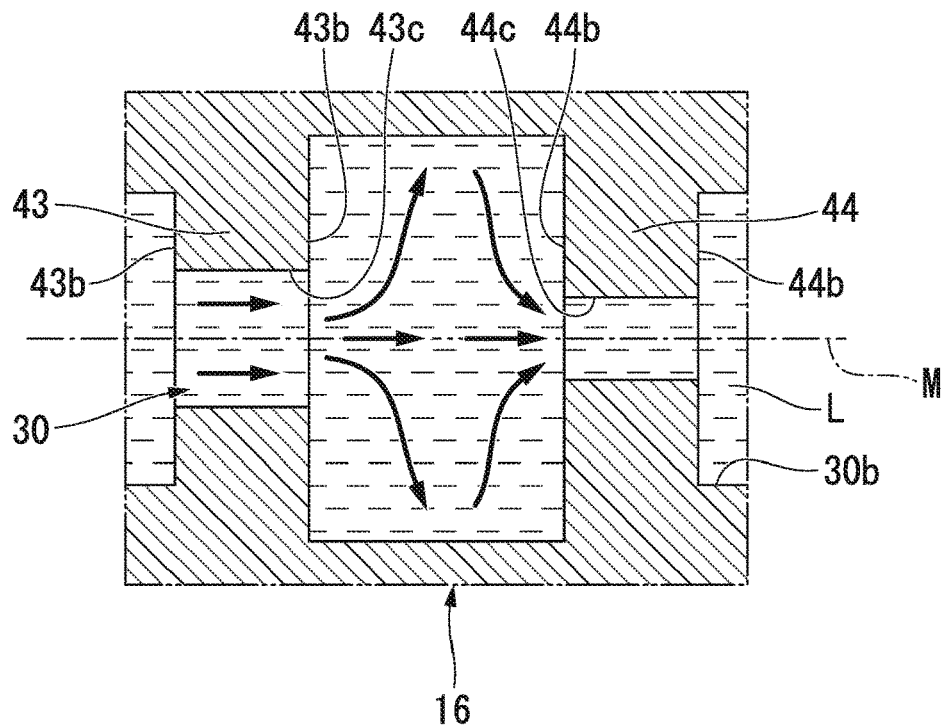
FIG. 13 is longitudinal sectional view, which is an enlarged view of main parts, of a vibration-damping device related to a sixth embodiment of the present invention.

Next, a sixth embodiment of the vibration-damping device related to the present invention will be described with reference to FIG. 13.

In the sixth embodiment, the same portions as the constituent elements in the fifth embodiment will be designated by the same reference signs and a description thereof will be omitted, and only different points will be described.

In the vibration-damping device of the present embodiment, the flow changing protrusions 43 and 44 are formed in a rectangular shape, instead of being formed in a right-angled triangle shape that becomes convex toward the inner side in the flow passage radial direction, in the above vertical sectional view.

Both end surfaces of the flow changing protrusions 43 and 44 are respectively the orthogonal end surfaces 43b and 44b. The first passage hole 43c is provided over the entire length in the flow passage axis M direction of the first flow changing protrusion 43, within the first flow changing protrusion 43. The second passage hole 44c is provided over the entire length in the flow passage axis M direction of the second flow changing protrusion 44, within the second flow changing protrusion 44. The first passage hole 43c and the second passage hole 44c have the same diameter over the entire length in the flow passage axis M direction. The first passage hole 43c has a greater diameter than the second passage hole 44c.

When vibration is input to this vibration-damping device and the liquid L flows through the limiting passage 30 from the main liquid chamber 14 toward the auxiliary liquid chamber 15, the liquid L that flows through the outer side in the flow passage radial direction within the linear passage part 30b of the liquid L that has flowed into the linear passage part 30b from the main opening 30a, flows from the base end toward the protruding end along the orthogonal end surface 43b that faces the outside in the flow passage axis M direction, in the first flow changing protrusion 43, and thereby the flow of the liquid L is changed toward the inner side in the flow passage radial direction. Additionally, the liquid L that flows through the inner side in the flow passage radial direction within the linear passage part 30b of the liquid L that has flowed into the linear passage part 30b, passes through the first passage hole 43c in the flow passage axis M direction.

Accordingly, if the flow speed of the liquid L is increased, the pressure loss of the liquid L is increased due to, for example, an energy loss resulting from the collision between the liquid L that passes through the first passage hole 43c in the flow passage axis M direction, and the liquid L, the flow of which is changed by the first flow changing protrusion 43.

Seventh Embodiment

Figure 14:
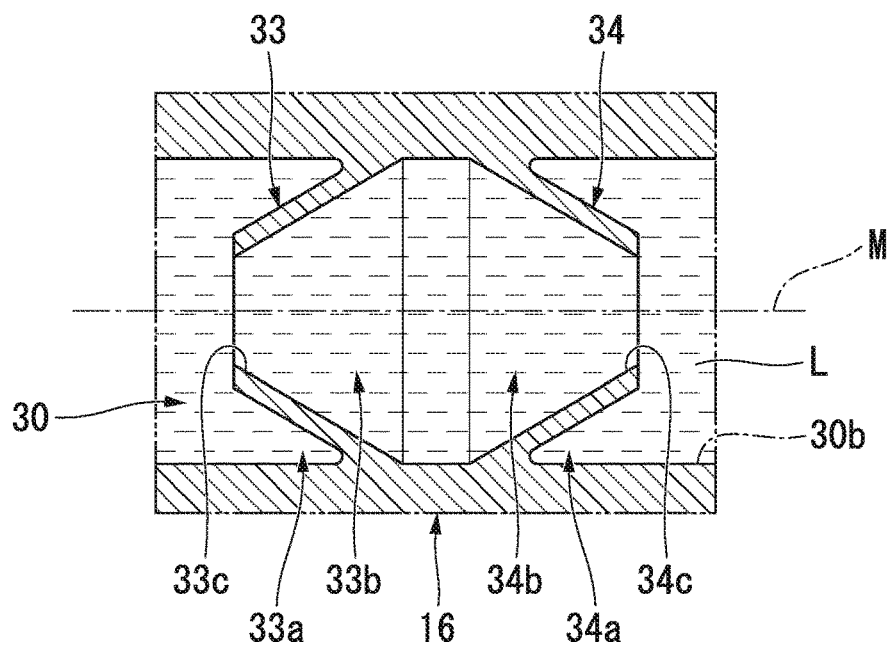
FIG. 14 is longitudinal sectional view, which is an enlarged view of main parts, of a vibration-damping device related to a seventh embodiment of the present invention.

Next, a seventh embodiment of the vibration-damping device related to the present invention will be described with reference to FIG. 14.

In addition, in the seventh embodiment, the same portions as the constituent elements in the first embodiment will be designated by the same reference signs and a description thereof will be omitted, and only different points will be described.

In the vibration-damping device of the present embodiment, a first flow changing protrusion 33 and a second flow changing protrusion 34 are provided as the above flow changing protrusion. A first passage hole 33c (passage hole) that is an opening on a protruding end (free end) side of the first flow changing protrusion 33 faces the main liquid chamber 14 side in the flow passage axis M direction, and a second passage hole 34c (passage hole) that is an opening on a protruding end (free end) side of the second flow changing protrusion 34 faces the auxiliary liquid chamber 15 side in the flow passage axis M direction.

The first flow changing protrusion 33 is located on the main liquid chamber 14 side in the flow passage axis M direction, the second flow changing protrusion 34 is located on the auxiliary liquid chamber 15 side in the flow passage axis M direction, and the first flow changing protrusion 33 and the second flow changing protrusion 34 are located over the entire length in the flow passage axis M direction within the linear passage part 30b. The first flow changing protrusion 33 and the second flow changing protrusion 34 are symmetrically formed in the flow passage axis M direction, and base ends (fixed end) of the first flow changing protrusion 33 and the second flow changing protrusion 34 are separated from each other in the flow passage axis M direction.

The first flow changing protrusion 33 partitions the inside of the linear passage part 30b into a first flow changing space 33a serving as the above flow changing space, and a first passage space 33b serving as the above passage space.

The first flow changing space 33a is formed in a ring shape coaxial with the flow passage axis M, and is open on the main liquid chamber 14 side in the flow passage axis M direction. In the above vertical sectional view, the space width of the first flow changing space 33a in the flow passage radial direction becomes gradually smaller from the main liquid chamber 14 side toward the auxiliary liquid chamber 15 side in the flow passage axis M direction. A bottom surface of the first flow changing space 33a faces the main liquid chamber 14 side in the flow passage axis M direction, and couples together the outer peripheral surface of the first flow changing protrusion 33 and the inner peripheral surface of the linear passage part 30b. In the above vertical sectional view, the bottom surface of the first flow changing space 33a is formed in the shape of a concavely curved surface that becomes concave toward the auxiliary liquid chamber 15 side in the flow passage axis M direction.

The first passage space 33b is formed in the shape of a frustum coaxial with the flow passage axis M, and in the example shown, in the shape of a truncated cone, and is open on both sides in the flow passage axis M direction. The first passage space 33b is gradually increased in diameter from the main liquid chamber 14 side toward the auxiliary liquid chamber 15 side in the flow passage axis M direction.

The second flow changing protrusion 34 partitions the inside of the linear passage part 30b into a second flow changing space 34a serving as the above flow changing space, and a second passage space 34b serving as the above passage space.

The second flow changing space 34a is formed in a ring shape coaxial with the flow passage axis M, and is open on the auxiliary liquid chamber 15 side in the flow passage axis M direction. In the above vertical sectional view, the space width of the second flow changing space 34a becomes gradually smaller from the auxiliary liquid chamber 15 side toward the main liquid chamber 14 side in the flow passage axis M direction. A bottom surface of the second flow changing space 34a faces the auxiliary liquid chamber 15 side in the flow passage axis M direction, and couples together the outer peripheral surface of the second flow changing protrusion 34 and the inner peripheral surface of the linear passage part 30b. In the above vertical sectional view, the bottom surface of the second flow changing space 34a is formed in the shape of a concavely curved surface that becomes concave toward the main liquid chamber 14 side in the flow passage axis M direction.

The second passage space 34b is formed in the shape of a frustum coaxial with the flow passage axis M, and in the example shown, in the shape of a truncated cone, and is open on both sides in the flow passage axis M direction. The second passage space 34b is gradually increased in diameter from the auxiliary liquid chamber 15 side toward the main liquid chamber 14 side in the flow passage axis M direction.

Eighth Embodiment

Figure 15:
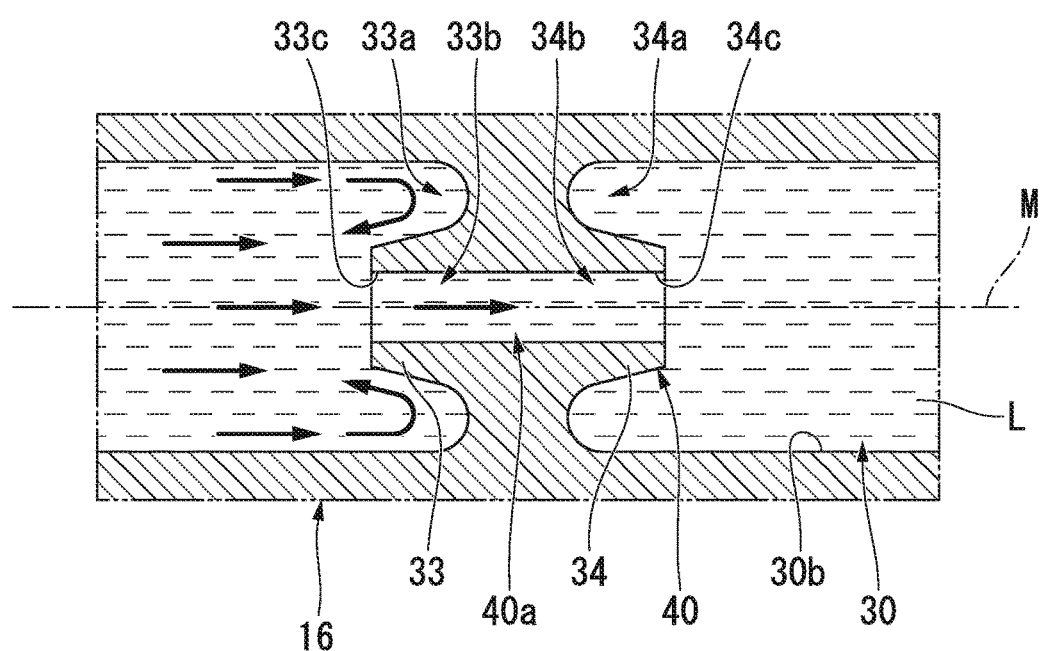
FIG. 15 is longitudinal sectional view, which is an enlarged view of main parts, of a vibration-damping device related to an eighth embodiment of the present invention.

Next, an eighth embodiment of the vibration-damping device related to the present invention will be described with reference to FIG. 15.

In addition, in the eighth embodiment, the same portions as the constituent elements in the seventh embodiment will be designated by the same reference signs and a description thereof will be omitted, and only different points will be described.

In the vibration-damping device of the present embodiment, the first flow changing protrusion 33 and the second flow changing protrusion 34 are disposed adjacent to each other in the flow passage axis M direction, and the base ends of the flow changing protrusions 33 and 34 are directly connected together. The inner peripheral surfaces of the respective flow changing protrusions 33 and 34 have the same diameter over the entire length in the flow passage axis M direction, and the passage spaces 33b and 34b are formed in a columnar shape that extends in the flow passage axis M direction. A second end of the first passage space 33b and a first end of the second passage space 34b are directly connected together.

In this vibration-damping device, a coupled body 40 in which the base ends of the flow changing protrusions 33 and 34 are directly connected together is formed in a tubular shape that extends in the flow passage axis M direction. The inside of this coupled body 40 forms a connected space 40a in which the passage spaces 33b and 34b are connected together in the flow passage axis M direction. An inner peripheral surface of the connected space 40a is smoothly continuous over the entire length in the flow passage axis M direction, and a stepped part is not formed.

In addition, the technical scope of the present invention is not limited to the above embodiments, and various changes can be made without departing from the concept of the present invention.

Additionally, in the above first, seventh, and eighth embodiments, the outer peripheral surface of the flow changing protrusion 31, 33, or 34 gradually decreases in diameter from the base end toward the protruding end. However, the present invention is not limited to this. For example, the outer peripheral surface of each flow changing protrusion may be formed in a tubular shape with the same diameter over the entire length in the flow passage axial direction, and the base end of the flow changing protrusion may be coupled to the inner peripheral surface of the first limiting passage via a flange part.

Additionally, the limiting passage 30 and the flow changing protrusion 31, 33, 34, 36, 41, 42, 43, or 44 may not be perfect linear symmetrical with the flow passage axis M as a reference in the above vertical sectional view. For example, there may be a slight difference in the shape, size, or the like of the limiting passage and the flow changing protrusions on a first side and a second side in the flow passage radial direction with respect to the flow passage axis M, in the above vertical sectional view.

Additionally, in the above embodiment, the flow passage axis M that is a central axis of the linear passage part 30b is located on the above orthogonal plane. However, the present invention is not limited to this. For example, the flow passage axis M may extend in the axis direction or may extend in the circumferential direction.

Additionally, in the present embodiments, a case where an engine is connected to the second attachment member 12 and the first attachment member 11 is connected to a vehicle body is described. However, contrary to this, the first and second attachment members may be connected.

Moreover, the vibration-damping device 10 related to the present invention is not limited to engine mounts of vehicles and can also be applied to those other than the engine mounts. For example, the present invention can also be applied to mounts of generators loaded on construction machines, or can also be applied to mounts of machines installed in factories or the like.

In addition, the constituent elements in the above embodiments can be substituted with well-known constituent elements without departing from the concept of the present invention, and the above embodiments may be appropriately combined together.

INDUSTRIAL APPLICABILITY

According to the vibration-damping device related to the present invention, manufacturing can be easily performed due to a simple structure, generation of a negative pressure in the main liquid chamber can be prevented, and a stable damping performance can be exhibited for a prolonged period of time while generation of abnormal noise is reduced.

REFERENCE SIGNS LIST

10: VIBRATION-DAMPING DEVICE
11: FIRST ATTACHMENT MEMBER
12: SECOND ATTACHMENT MEMBER
13: ELASTIC BODY
14: MAIN LIQUID CHAMBER
15: AUXILIARY LIQUID CHAMBER
16: PARTITIONING MEMBER
30: LIMITING PASSAGE
31, 33, 34, 36, 41, 42, 43, 44: FLOW CHANGING PROTRUSION
31a, 33a, 34a, 36a: FLOW CHANGING SPACE

31*b*, 33*b*, 34*b*, 36*b*: PASSAGE SPACE
31*c*, 33*c*, 34*c*, 36*c*, 41*c*, 42*c*, 43*c*, 44*c*: PASSAGE HOLE
L: LIQUID

The invention claimed is:

1. A vibration-damping device comprising:
a tubular first attachment member coupled to any one of a vibration generating part and a vibration receiving part, and a second attachment member coupled to the other thereof;
an elastic body that couples the first attachment member and the second attachment member together; and
a partitioning member that partitions a liquid chamber within the first attachment member having a liquid enclosed therein into a main liquid chamber having the elastic body as a portion of a wall surface thereof, and an auxiliary liquid chamber,
wherein a limiting passage that allows the main liquid chamber and the auxiliary liquid chamber to communicate with each other is formed in the partitioning member,
wherein an inner peripheral surface of the limiting passage is provided with a flow changing protrusion that protrudes toward an inner side in a radial direction of the limiting passage and that changes the flow of a liquid that flows into the limiting passage from the main liquid chamber and flows through the limiting passage in an axial direction of the limiting passage,
wherein, in a vertical cross-sectional view passing through an axis of the limiting passage and through the flow changing protrusion, the limiting passage and the flow changing protrusion have symmetrical shapes with respect to the axis of the limiting passage,
wherein a protruding end of the flow changing protrusion forms an inner peripheral edge of a passage hole that is open on both sides in the axial direction of the limiting passage, and
wherein the flow changing protrusion is formed integrally with the partitioning member as a rigid body having rigidity such that the flow changing protrusion is not deformed when the flow of the liquid is received.

2. The vibration-damping device according to claim 1,
wherein the flow changing protrusion partitions the limiting passage into a flow changing space that is formed between the flow changing protrusion and an inner peripheral surface of the limiting passage and changes the flow of the liquid flowing thereinto, and a passage space that has the passage hole and allows the liquid flowing thereinto to pass therethrough.

3. The vibration-damping device according to claim 2,
wherein the flow changing protrusion extends in the axial direction, and an opening thereof on a protruding end side is formed in a tubular shape used as the passage hole,
wherein the flow changing space is formed between an outer peripheral surface of the flow changing protrusion and an inner peripheral surface of the limiting passage, and
wherein the passage space is formed by an inner peripheral surface of the flow changing protrusion.

4. The vibration-damping device according to claim 3,
wherein the outer peripheral surface of the flow changing protrusion gradually decreases in diameter from a base end located on an auxiliary liquid chamber side toward a protruding end in the axial direction.

5. The vibration-damping device according to claim 1, wherein the flow changing protrusion protrudes only in one direction of the axial direction of the limiting passage, such that the flow changing protrusion approaches the main liquid chamber as the flow changing protrusion protrudes from the inner peripheral surface of the limiting passage.

6. A vibration-damping device comprising:
a tubular first attachment member coupled to any one of a vibration generating part and a vibration receiving part, and a second attachment member coupled to the other thereof;
an elastic body that couples the first attachment member and the second attachment member together; and
a partitioning member that partitions a liquid chamber within the first attachment member having a liquid enclosed therein into a main liquid chamber having the elastic body as a portion of a wall surface thereof, and an auxiliary liquid chamber,
wherein a limiting passage that allows the main liquid chamber and the auxiliary liquid chamber to communicate with each other is formed in the partitioning member,
wherein the limiting passage includes a main opening, a linear passage part, a circumferential groove part, and a sub-opening,
wherein the main opening extends in a parallel direction with respect to an axis of the first attachment member from a first end on one end surface of the partitioning member in communication with the main liquid chamber to a second end terminating within the partitioning member,
wherein the linear passage part extends in an orthogonal direction with respect to the axis of the first attachment member from the second end of the main opening to a peripheral end opening in an outer peripheral surface of the partitioning member,
wherein the circumferential groove part is formed between the outer peripheral surface of the partitioning member and an inner peripheral surface of the first attachment member,
wherein the circumferential groove part extends in a circumferential direction from the peripheral end of the linear passage part to the other peripheral end,
wherein the sub-opening extends in a parallel direction with respect to the axis of the first attachment member from the other peripheral end of the circumferential groove part to the other end surface of the partitioning member in communication with the auxiliary liquid chamber,
wherein an inner peripheral surface of the linear passage part is provided with a flow changing protrusion that protrudes toward an inner side in a radial direction of the linear passage part and that changes the flow of a liquid that flows into the linear passage part from the main liquid chamber and flows through the limiting passage in an axial direction of the linear passage part,
wherein, in a vertical cross-sectional view passing through an axis of the linear passage part and through the flow changing protrusion, the linear passage part and the flow changing protrusion have symmetrical shapes with respect to the axis of the linear passage part, and
wherein a protruding end of the flow changing protrusion forms an inner peripheral edge of a passage hole that is open on both sides in the axial direction of the linear passage part.

7. The vibration-damping device according to claim 6, wherein the flow changing protrusion protrudes only in one direction of the axial direction of the linear passage part, such that the flow changing protrusion approaches the main liquid chamber as the flow changing protrusion protrudes from the inner peripheral surface of the linear passage part.

8. The vibration-damping device according to claim 6, wherein the flow changing protrusion is formed integrally with the partitioning member as a rigid body.

* * * * *